Nov. 19, 1968
K. E. PETERSON
3,411,296
HYDROSTATIC TRANSMISSION
Filed April 13, 1966
4 Sheets-Sheet 1
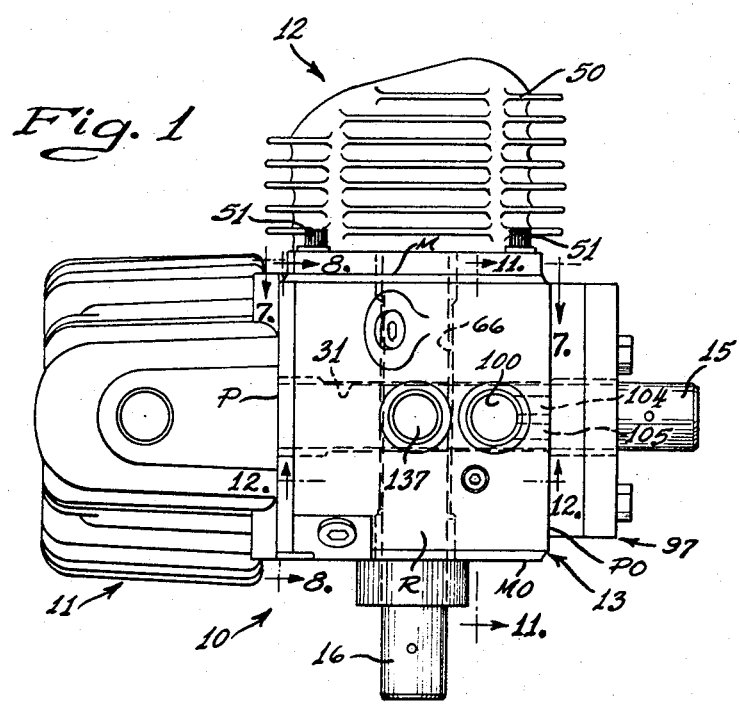
Inventor
Kenneth E. Peterson
By Hofgren, Wegner,
Allen, Stellman & McCord Att'ys

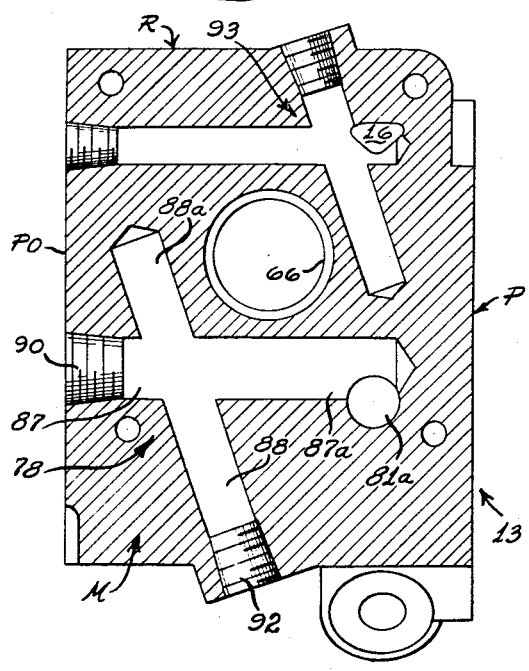
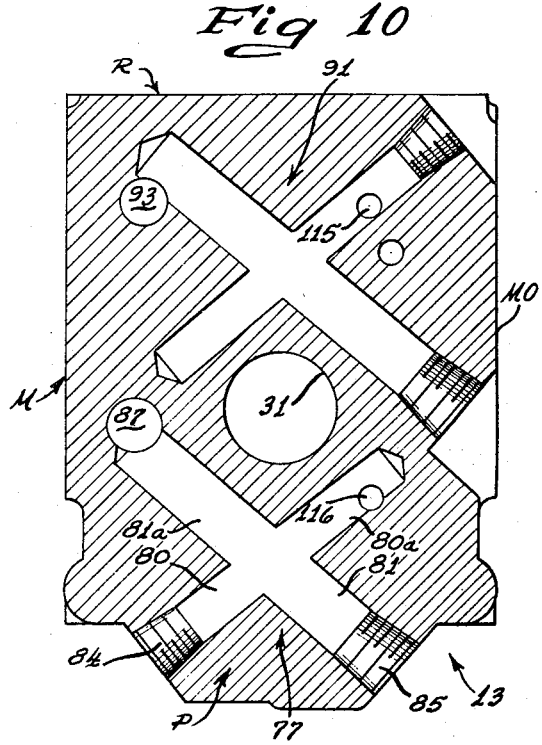
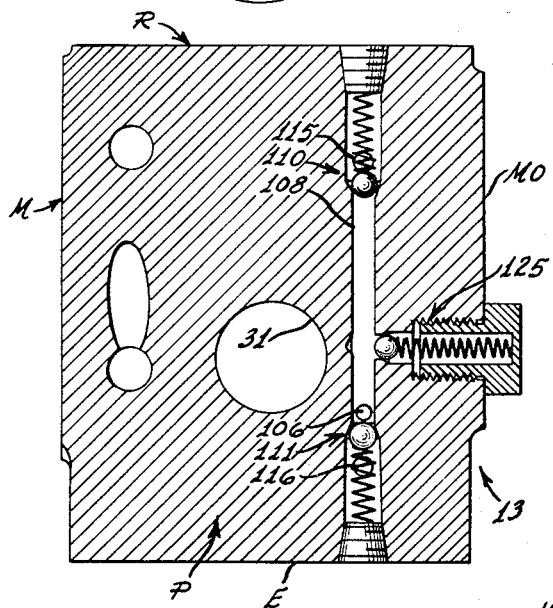
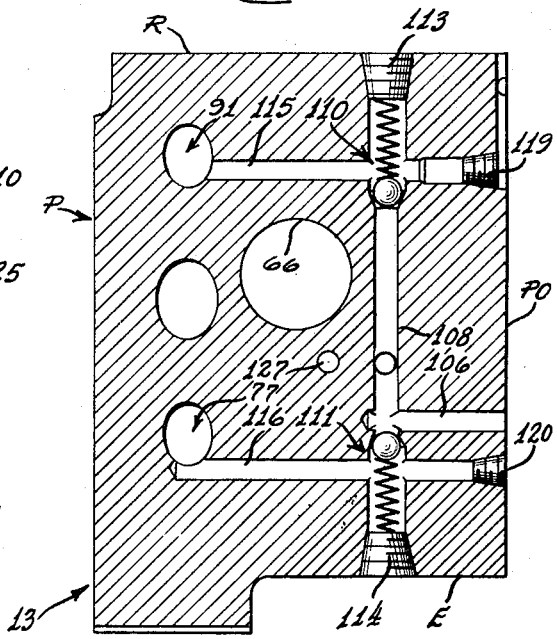

United States Patent Office 3,411,296
Patented Nov. 19, 1968

3,411,296
HYDROSTATIC TRANSMISSION
Kenneth E. Peterson, Rockford, Ill., assignor to Sundstrand Corporation, a corporation of Delaware
Filed Apr. 13, 1966, Ser. No. 542,275
14 Claims. (Cl. 60—53)

ABSTRACT OF THE DISCLOSURE

A hydrostatic transmission including axial piston pumps and motors mounted on adjacent perpendicular faces of a generally cubic integral valve block with both the pump and the motor shafts extending in perpendicular directions completely through the valve block and being supported therein.

This invention relates generally to hydrostatic transmissions and more particularly to a hydrostatic transmission of compact and simplified design for driving a vehicle.

In the past it has been conventional to provide a hydrostatic transmission consisting of a hydraulic pump and a hydraulic motor for infinitely varying the speed of a vehicle. Certain vehicles, particularly the smaller types such as riding lawn mowers, require a small and compact transmission. Prior hydraulic transmissions for this purpose have usually employed pumps and motors disposed so that their axes of rotation are in line or parallel. Due to the axial length of the pump and motors conventionally employed for this purpose and the parallel arrangement thereof, and also due to the space required by the conduits interconnecting the pump and the motor, these prior hydraulic transmissions consume considerable space in a small vehicle and oftentimes require special design of the vehicle to accommodate them.

In accordance with the present invention, a hydrostatic transmission is provided in which the pump, motor and hydraulic circuitry are all arranged in a unitary package to provide a more compact and simplified transmission than heretofore known to those in this art. All of the component parts of the present transmission, including the pump, motor, drive shafts, charge pump and reservoir are supported on a generally cubic valve block. The valve block has drilled passages which define all of the various hydraulic circuit conduits for the operation of the transmission. The passages and the valve block are drilled rather than formed by other means such as coring to simplify the manufacture thereof. The drive shafts are fully supported within the valve block thus eliminating the necessity for bearings external to the valve block in either the pump or the motor housing. Further, the drive shafts, i.e., the input shaft and the output shaft, are disposed generally transversely to each other in the valve block so that the pump and motor are disposed at generally right angles to one another thus reducing the required axial length of the over-all transmission. This is particularly advantageous in transmissions employing the axial piston type of hydraulic pumps and motors.

It is therefore a primary object of the present invention to provide a new and improved hydrostatic transmission of compact and simplified design.

Another object of the present invention is to provide a new and improved hydrostatic transmission in which a valve block supports both the pump and the motor so that the input and output shafts lie in intersecting planes thus minimizing the length of the transmission so that it permits the use of larger size hydraulic units for a given installation envelope.

A more specific object of the present invention is to provide a new and improved hydrostatic transmission of the type described above in which the valve block is a generally cubic unitary block containing all the necessary passages to complete the hydraulic circuit between the pump and the motor and further supports the input and output shafts so they are cantilevered into the pump and motor housings, thereby eliminating the necessity for outboard bearings in the housings. This permits the use of simplified and economical housings.

A more specific object of the present invention is to provide a new and improved hydrostatic transmission of the type described immediately above in which the hydraulic circuit includes passages in the valve block to and from a charge pump for supplying makeup fluid to the circuit and to and from a reservoir for receiving leakage fluid with the passages being formed within the valve block. Provision is made for mounting both the charge pump and the reservoir on the valve block.

Another object of the present invention is to provide a new and improved hydrostatic transmission of the type described above in which the valve block is an integral member with all of the hydraulic passages being formed therein by drilling to provide a simplified structure and facilitate the manufacture of the transmission package.

A further object of the present invention is to provide a new and improved hydrostatic transmission of the type described above in which the valve block is a generally cubic member with the pump taking the form of an axial piston hydraulic unit fixed to a first face of the block, a charge pump for supplying makeup fluid to the circuit is fixed to the face of the block opposite the first face with the input shaft extending through the block and drivingly connected to the charge pump, with the motor also taking the form of an axial piston hydraulic unit fixedly mounted on a second face of the block adjacent and perpendicular to the latter mentioned faces and the output shaft connected to the motor and extending through the block projecting therefrom at the face thereof opposite the second face, and with a third face of the block being adapted to receive a reservoir for collecting leakage and makeup fluid for the hydraulic circuit.

A still further object of the present invention is to provide a new and improved hydraulic unit having a valve member with inlet and discharge ports therein, a cylinder block having cylinders therein with one end thereof slidably engaging a bearing surface on the valve member, pistons reciprocably mounted in the cylinders and a cam for reciprocating the pistons upon relative rotational motion between the cylinder block and the cam member; with a new and improved port configuration in the valve member including inlet and discharge ports each defined by a plurality of holes formed in the valve bearing surface so that the spaces between the holes define additional bearing surfaces which receive a fresh supply of lubricant each time a cylinder port in the block passes thereover. This effectively increases the bearing area of the valve member and lowers the unit bearing pressure thereby reducing wear on the valving surface. In conventional valve plate designs, continuous arcuate inlet and outlet ports are provided so that the bearing lands are limited to the areas radially inwardly and outwardly of the arcuate ports. The lubricating oil supplied to these surfaces is merely leakage fluid and varies substantially depending upon the pressure, the flatness of the bearing surface and other factors. Such an arrangement has been found inadequate in many applications of hydraulic units of this nature.

Other and further objects and advantages will become apparent from the following detailed description taken in connection with the accompanying drawings, in which:

FIG. 1 is a top elevation of the present hydrostatic transmission assembled except for the reservoir which has been removed for clarity;

FIG. 2 is a rear elevation of the hydrostatic transmission shown in FIG. 1;

FIG. 9 is a cross section of the valve block taken generally along line 9—9 in FIG. 8 showing a portion of the hydraulic circuit between the pump and the motor;

FIG. 10 is a cross section taken generally along line 10—10 of FIG. 7 showing another portion of the hydraulic circuit between the pump and the motor;

FIG. 11 is a cross section, rotated 90 degrees, taken generally along line 11—11 of FIG. 1 showing still another portion of the circuit interconnecting the pump and the motor;

Figure 3:
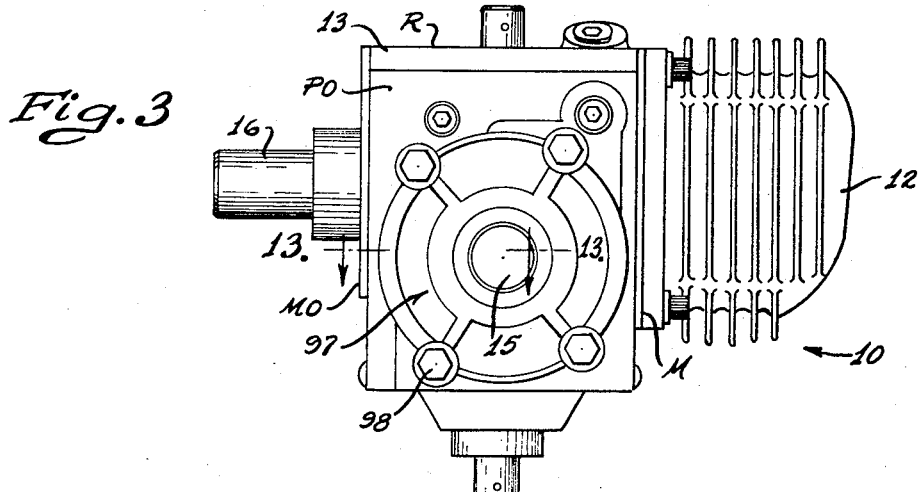
FIG. 3 is a right side elevation of the transmission shown in FIG. 1.
Figure 4:
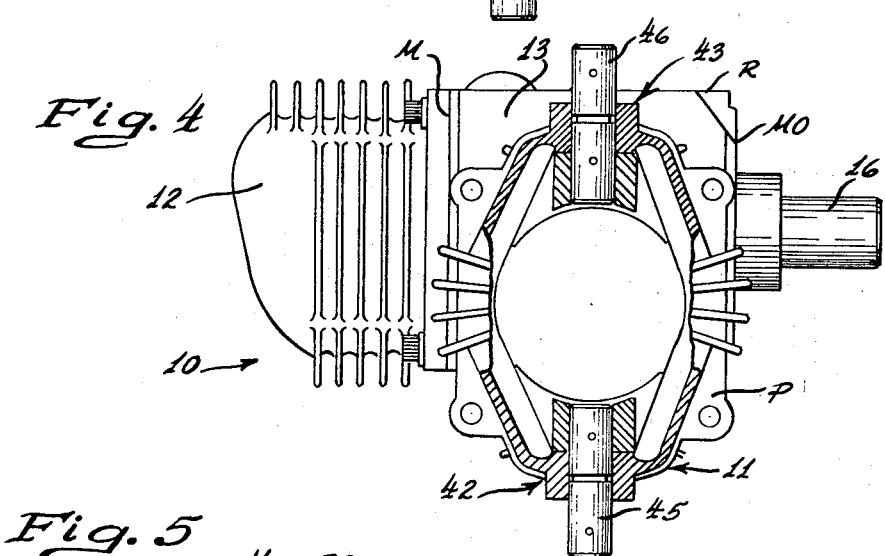
FIG. 4 is a left side elevation of the hydrostatic transmission shown in FIG. 1, taken opposite the FIG. 3 elevation, partially in cross section.
Figure 13:
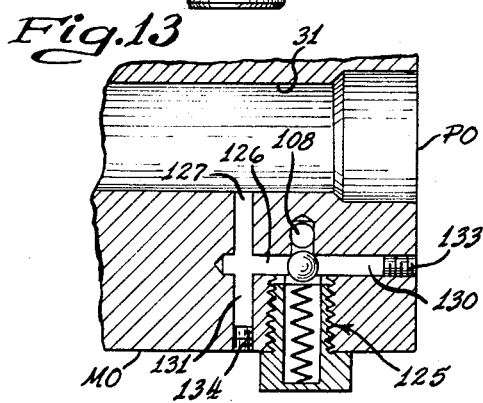

FIG. 12 is a cross section of the valve block taken perpendicular to the section of FIG. 11 and generally along line 12—12 in FIG. 1 showing a portion of the hydraulic circuit interconnecting the pump and the motor; and FIG. 13 is a fragmentary section, rotated 90 degrees, taken generally along line 13—13 in FIG. 3 showing the charge pressure relief valve in the valve block.

Referring now in detail to the drawings, and particularly FIGS. 1 to 4 therein, a hydrostatic transmission 10 is provided which is particularly useful in transmitting power from the motor of a small vehicle such as a riding lawn mower to the drive wheels for propelling the vehicle. The transmission ratio is infinitely variable to provide any desired output speed. It should be understood that the reference to drawing figures as top elevation, side elevation, etc., is arbitrary and that the present transmission may in practice be installed in any position desired.

The transmission 10 is a unitary package or unit facilitating installation, and consists generally of a variable displacement pump 11, a fixed displacement motor 12, and a generally cubic integrally formed valve block 13 which supports both the pump and the motor. An input shaft 15 supported within the valve block 13 is adapted to be driven by the vehicle prime mover and is connected to drive the pump 11. An output shaft 16, also supported within the valve block 13, is connected to be driven by the motor 12 and has one end thereof projecting from the valve block 13 adapted to be connected through suitable gearing to drive the associated vehicle. The pump 11, as will appear more clearly hereinafter, along with input shaft 15, is disposed in a plane generally transverse to the motor 12 and the output shaft 16 to reduce the axial length of the overall transmission and facilitate installation in a limited envelope.

To facilitate an understanding of the location of the various views in the drawings, the six faces of the valve block 13 are identified herein as follows:

P—the pump valve and mounting surface,
M—the motor valve and mounting surface,
PO (parallel to P)—the surface through which the input shaft 15 projects from the unit,
MO (parallel to M)—the surface through which the output shaft 16 projects from the unit,
R (perpendicular to P, M, PO and MO) for the surface of the block adapted to receive the reservoir and filter (not shown),
B—the remaining surface of the valve block 13.

Figure 5:
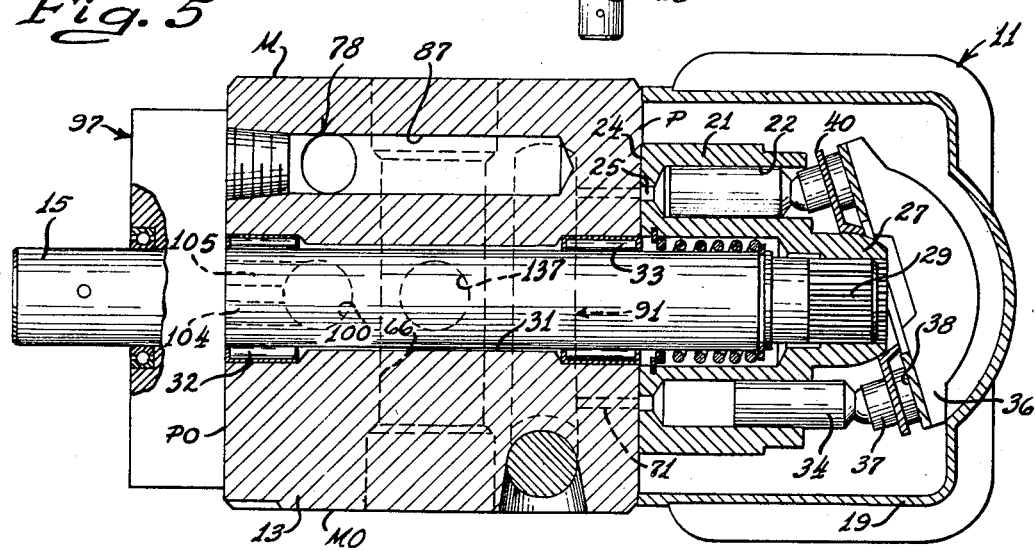
FIG. 5 is a cross section taken generally along line 5—5 of FIG. 2 illustrating the pump and portions of the valve block, with the motor removed for simplification.

As shown more clearly in FIGS. 2 and 5, the variable displacement pump 11 is seen to be generally of the well known axial piston type. A generally bell-shaped pump housing 19 is provided and is fixed to the valve face P of the valve block 13 by suitable threaded fasteners 20. A cylinder block 21 has a plurality of axial cylinders 22 formed in annular array therein communicating with a valve surface 24 on one end of the cylinder block through cylinder ports 25. A projection 27 extends from the rear of cylinder block 21 and has internal splines formed therein which interengages with splines 29 on the cantilevered end of input shaft 15. Input shaft 15, which rotates cylinder block 21, extend through a bore 31 in the valve block 13 and is solely supported therein by bearings 32 and 33 so that the pump connected end of the shaft is cantilevered within the pump housing 19. This eliminates the necessity for an outboard bearing in housing 19.

Pistons 34 are slidably disposed in the cylinders 22 and are reciprocated by an inclined cam or swashplate member 36 through slippers 3 which are pivotally connected to the pistons 34 and which slidably engage the cam face 38. A piston retainer plate 40 is provided for urging the slippers 37 into engagement wtih the cam surface 38. The swashplate 36 is pivotally mounted within the housing 23 by suitable trunnion assemblies 42 and 43 (FIG. 4) which include shafts 45 and 46 projecting from the housing. Suitable control linkage may be connected to one of the shafts 45 or 46 for the purpose of varying the angle of swashplate 46 and thereby varying the displacement of the pump 11 to control the output flow from the pump to the motor and thus vary the speed of output shaft 16.

Figure 6:
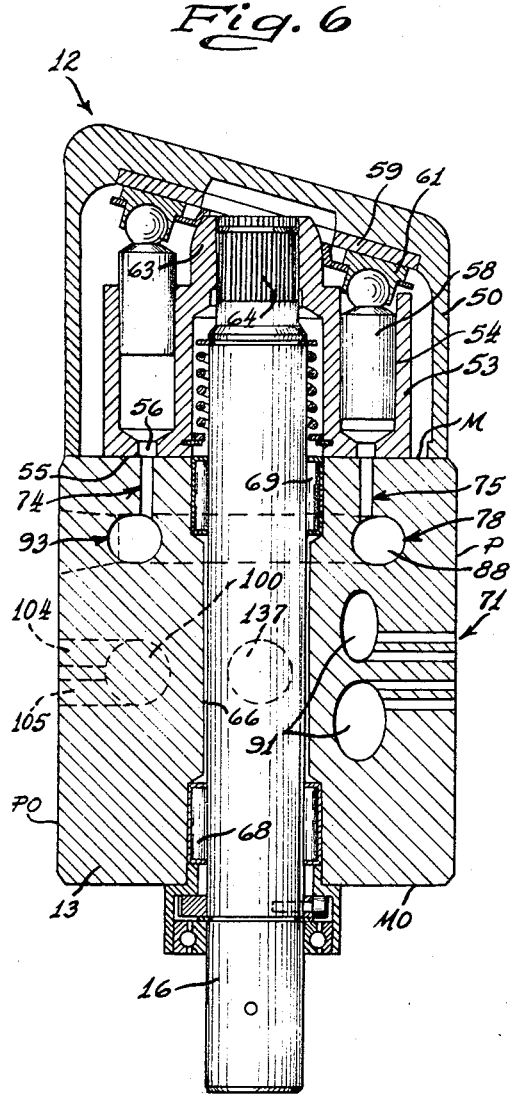
FIG. 6 is a cross section taken generally along line 6—6 of FIG. 2 showing the motor construction and a portion of the valve block, with the pump removed for simplification.

As seen more clearly in FIGS. 1 and 6, the motor 12 is seen to be of the fixed displacement axial piston type of generally similar construction to the variable displacement pump 11. A finned bell-shaped housing 50 is provided for the motor and is fixedly mounted to the valve block surface M by suitable threaded fasteners 51. Similar to the pump construction, the motor 12 includes a rotatable cylinder block 53 having a plurality of axially disposed cylinders 54 therein which communicate with the motor block valve face 55 through motor block ports 56. Pistons 58 slidably mounted in the cylinders 54 are reciprocated by cam plate 59 mounted within a suitable counter bore within the end of housing 50. Bearing slippers 61 are provided between the pistons and the cam 59 and are similar in construction and function to slippers 37 in the pump.

A rearward projection 63 on the end of cylinder block 53 has internal splines therein which interengage with splines 64 on the cantilevered end of the output shaft 16, to transmit output torque from the motor cylinder block to the output shaft. As high pressure fluid is delivered from the pump 11 to the motor 12, the pistons 58 reciprocate driving the cylinder block 53 and the output shaft 16 in rotation.

The output shaft 16, like the input shaft 15, extends through a bore 66 of the valve block 13 and is solely supported within the valve block by bearings 68 and 69 so that the motor connected end of shaft 16 is cantilevered within motor housing 50. It should be noted that input shaft bore 31 is below the output shaft bore 66 when viewing the transmission in side elevation, as in FIG. 3. These bores intersect slightly to provide fluid communication therebetween, but not sufficiently to permit interference between shafts 15 and 16. Furthermore, bore 31 and shaft 15 lie in a plane perpendicular to the axis of bore 66 and shaft 16, that is perpendicular to a plane, passing through the center of bore 66 and the axis of shaft 16, that is perpendicular to the axis of shaft 15. This provides the generally transverse arrangement of the input and the output shafts along with the right angular relationship between the pump and the motor to provide a more compact transmission package.

The multi-purpose valve block 13 is provided for supporting all of the component parts of the transmission and defines all of the hydraulic circuit passages between the pump and the motor in addition to housing certain valves in the hydraulic circuit. Valve block 13 is an integral casting with all the fluid passages formed therein by drilling to simplify the manufacture thereof.

Figure 8:
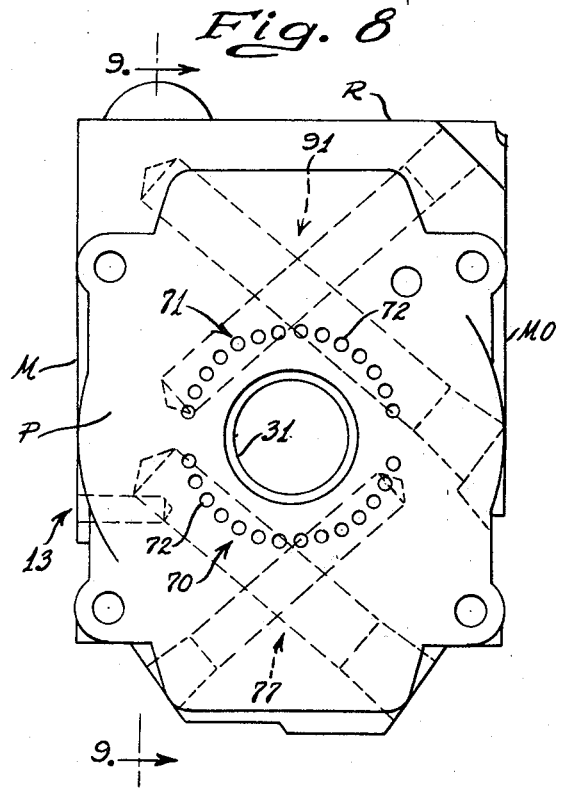
FIG. 8 is an elevation view, rotated 90 degrees, of the pump valve face on the valve block taken generally along line 8—8 in FIG. 1.

Defined within the valve block 13 are reversible passages which convey fluid from the pump to the motor and return fluid from the motor to the pump in closed circuit fashion. These may be referred to as the main circuit passages each of which is defined by a plurality of drilled holes within the valve block 13. Toward this end two arcuate ports 70 and 71 are formed in the pump valve face P (FIG. 8). Each of these ports is defined by a plurality of spaced drilled holes 72 which are perpendicular to the valve face P. The surfaces around each of the holes 72 are coplanar so that the spaces between the holes act as an additional bearing surface for the bearing portions or areas on the pump cylinder block face 24 between the cylinder ports 25 as the cylinder block rotates. The spaces between the holes 72 are also efficiently lubricated as the ports 25 pass thereover.

Figure 7:
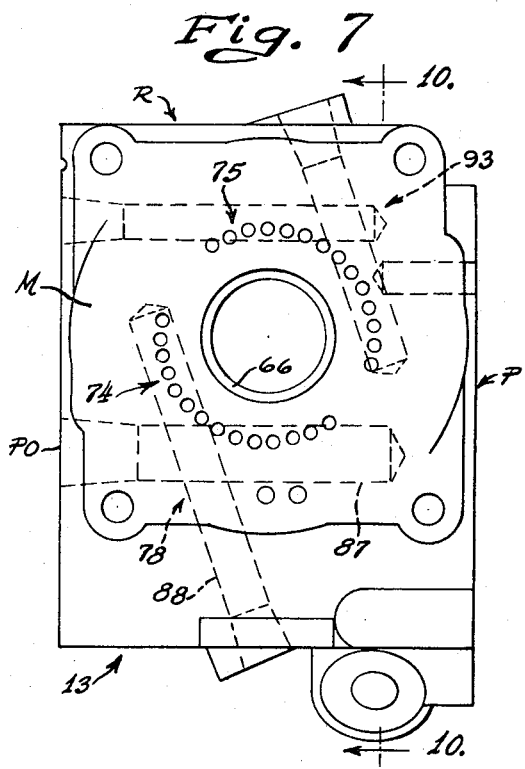
FIG. 7 is an elevation view, rotated 180 degrees, of the motor valve face on the valve block taken generally along line 7—7 of FIG. 1.

Referring to FIG. 7, ports 74 and 75 are provided in the motor valve face M on the valve block 13 and are similar in configuration and operation to the valve ports 70 and 71 in the pump valve face. Port 70 is hydraulically connected to motor port 74 by two pairs of intersecting drilled holes 77 and 78 (FIGS. 7, 8). As shown most clearly in FIGS. 8 and 10, hole pair 77 consists of drilled holes 80 and 81 both lying in a plane parallel to the pump valve face P but spaced slightly therefrom as shown in FIG. 5. The legs 80a and 81a of these holes define a generally arcuate chamber to which the drilled passages 72 of port 70 communicate, as shown in FIG. 5 in dotted lines. Drill bores 80 and 81 are closed at their open ends by plugs 84 and 85.

Bore pair 77 is in fluid communication with bore pair 78 (FIG. 9). Pair 78 consists of drilled passages 87 and 88 both formed in a plane parallel to and spaced from the motor valve face M (see FIG. 6). The port 74 (FIG. 7) defined by drilled passages communicates with the legs 87a and 88a of bores 87 and 88 respectively. Plugs 90 and 92 close the open ends of the bores 87 and 88, respectively. Leg 81a intersects leg 87a as shown in FIG. 9 to provide a fluid communication between the bore pair 77 and 78 and thus completing the fluid communication between the pump port 70 and the motor port 74 and defining one of the main passages between the pump and motor.

The pump port 71 communicates with the motor port 75 in a similar manner to that described above with respect to ports 70 and 74. Briefly, a pair of intersecting drilled holes 91 (FIG. 10) adjacent and parallel to the pump face P communicate with the holes 72 in valve port 71 and also communicate with the pair of intersecting drilled holes 93 (FIG. 9) parallel to and spaced from the motor valve face M. Bore pair 93 in turn communicates with the motor valve port 75 through holes 72 defining this port. It should be understood that bore pair 77 lies in a common plane with bore pair 91, and that bore pair 78 lies in a common plane with bore pair 93, all within the valve block 13.

By means of the main passages in the valve block 13 described above, fluid may be delivered between the pump and the motor in closed circuit fashion with either of the passages acting as a low or a high pressure passage.

As shown in FIG. 5, a charge pump 97 is provided for supplying makeup fluid to the two main passages interconnecting the pump and the motor. The charge pump 97 is fixed to the valve block surface PO by suitable threaded fasteners 98 (FIG. 3). While the details of the charge pump form no part of the present invention, it is preferable that this pump take the form of a gear rotor hydraulic device. The gear rotor may be of a commercially available type including an externally toothed gear connected to be driven by shaft 15 and eccentrically mounted internally toothed outer gear. Rotation of the inner gear causes the outer gear to rotate with expanding and contracting fluid chambers being formed by the spaces between the cooperating gear teeth.

The charge pump 97 receives hydraulic makeup fluid from a reservoir (not shown) which may be fixed on surface R of a valve block 13. The valve block has passages therein directing the fluid from the reservoir to the inlet and charge pump 97. Toward this end, a reservoir outlet port 100 extends vertically downward from valve member R (when the transmission is viewed in side elevation such as in FIG. 2), and terminates short of the input shaft bore 31. Port 100 communicates with the charge pump inlet through drilled passages 104 and 105 which extend parallel to and just above bore 31 when the transmission is viewed in side elevation.

Charge fluid from the charge pump is returned to the valve block through passage 106 which opens to valve member face PO as the charge pump outlet, as seen in FIG. 16, although the charge pump is not shown in this view for purposes of clarity. Passage 106 communicates with the central portion of a valve bore 108 drilled completely through the valve block 13 extending from and perpedicular to surfaces R and B. Spring biased check valve assemblies 110 and 111 in bore 108 permit communication between the charge pump outlet and the low pressure one of the main passages between the pump and the motor when the charge pressure is above that in the low pressure one of the main ports. Plugs 113 and 114 are provided for closing the ends of the bores and also serve as seats for the springs in the check valve assemblies. Communication is provided between the charge pump outlet passage 106 and the main ports through the check valves 110 and 111, and bores 115 and 116 which are perpendicular to valve block face PO and intersect both bore 108 and a portion of the bore pairs 91 and 77, respectively (see FIGS. 10, 11, and 12). Passages 115 and 116 like the other passages in valve member 13 are drilled with their ends closed by suitable plugs 119 and 120.

A charge relief valve 125 is provided in the valve block for discharging charge fluid to the reservoir when the system does not require makeup fluid as shown clearly in FIGS. 11 and 13. Valve 125 includes a check valve assembly and plug seated in a drilled and tapped bore extending perpendicular to valve member face MO and intersecting bore 108 between the check valve assemblies 110 and 111. As best seen in FIG. 13, charge fluid, when discharging across valve 125 passes through passages 126 and 127 to the input shaft bore 31. Passages 126 and 127 are defined by intersecting drilled bores 130 and 131 respectively, the ends of which are closed by plugs 133 and 134. Excess charge fluid and leakage fluid in bore 31 passes to the reservoir through motor shaft bore 66 (which is described above and slightly intersects bore 31) and reservoir inlet port 137 shown in FIG. 1. Port 137 extends from the reservoir surface R downwardly to and intersects the motor shaft bore 66.

As above described, all of the passages within the valve block 13 making up the hydraulic circuit between the pump and the motor are formed by drilling in the integral valve block simplifying the manufacture of the unit.

The transmission may be mounted in the associated vehicle by fixing suitable fasteners to one or more of the accessible faces of the valve block 13.

I claim:

1. A hydrostatic transmission, comprising: a hydraulic energy translating pump, an input shaft for driving said pump, a hydraulic energy translating motor, an output shaft driven by said motor, conduit means hydraulically interconnecting the pump and the motor including valve block means supporting both said pump and said motor, said valve block means having a first main passage therein for delivering fluid from the pump to the motor and a second main passage therein for returning fluid from the motor to the pump, said pump and said motor being supported on said block means so that the axes of said shafts are in non-parallel relation, said valve block means including an integral generally cubic block having said main passages therein, each of said main passages being defined by a plurality of drilled passages formed in said integral block, a charge pump for supplying makeup fluid to said main passages, charge passage means in said integral block for conveying charge fluid from said charge pump to said main passages, relief passage means in said integral block for conveying excess charge fluid to a reservoir, supply passage means in said integral block for conveying fluid from said reservoir to said charge pump, a first face of said cubic valve block receiving said pump, a second face of said valve block receiving said motor, said input shaft extending through said valve block and projecting therefrom at a third face opposite said first face, said output shaft extending through said valve block and projecting therefrom at a fourth face opposite said second face, said charge pump being mounted on said third face and connected to be driven by said input shaft, and a fifth face of said valve block being adapted to receive a reservoir, said charge pressure supply passage and said relief passage opening to said fifth face.

2. A hydrostatic transmission, comprising: a hydraulic energy translating pump, an input shaft for driving said pump, a hydraulic energy translating motor, an output shaft driven by said motor; and conduit means hydraulically interconnecting the pump and the motor including valve block means supporting both said pump and said motor, said valve block means having a first main passage therein for delivering fluid from the pump to the motor and a second main passage therein for returning fluid from the motor to the pump, said pump and said motor being supported on said block means so that the axes of said shafts are in non-parallel relation, said valve block means including a block having a first valve surface to which said main passages open for said pump and a second valve surface to which said main passages open for said motor, said first and second faces lying in intersecting planes; said pump including a rotatable cylinder block having axial cylinders therein, said cylinder block being drivingly connected to said input shaft and having one end thereof slidably engaging said first valve surface; said motor including a rotatable cylinder block having axial cylinders therein, said motor cylinder block being drivingly connected to said output shaft and having one end thereof slidably engaging said second valve surface; said valve block having a first through bore therein opening to said first surface, said input shaft being rotatably supported in said bore and having one end extending centrally within said pump cylinder block, said one end being free and drivingly connected to said cylinder block so that the input shaft is cantilevered adjacent said one end, the other end of said input shaft projecting from the valve block through a face thereof opposite said first face, said valve block having a second through bore opening to said second surface and extending generally transverse to said first through bore, said output shaft being rotatably supported in said second through bore and having one end thereof extending centrally within said motor cylinder block, said one end of said output shaft being free and drivingly connected to said motor cylinder block so that the output shaft is cantilevered adjacent said one end, the other end of said output shaft extending from the valve block through a face thereof opposite said second face.

3. A hydrostatic transmission, comprising: a hydraulic energy translating pump, an input shaft for driving said pump, a hydraulic energy translating motor, an output shaft driven by said motor; and conduit means hydraulically interconnecting the pump and the motor including valve block means supporting both said pump and said motor, said valve block means having a first main passage therein for delivering fluid from the pump to the motor and a second main passage therein for returning fluid from the motor to the pump, said pump and said motor being supported on said block means so that the axes of said shafts are in non-parallel relation, said valve block means including a block having a first valve surface to which said main passages open associated with said pump and a second valve surface to which said main passages open associated with said motor, said first and second surfaces being substantially perpendicular to each other, said pump including a rotatable cylinder block having axial cylinders therein, said cylinder block being drivingly connected to said input shaft and having one end thereof slidably engaging said first valve surface; said motor including a rotatable cylinder block having axial cylinders therein, said motor cylinder block being drivingly connected to said output shaft and having one end thereof slidably engaging said second valve surface, each of said main passages including an arcuate port in each of said first and second surfaces, said ports including a series of spaced openings in said surfaces, a portion of said surfaces defining the spaces between said openings so that said spaces provide bearing surfaces for the cylinder block.

4. A hydrostatic transmission as defined in claim 3 wherein each of said main passages includes a pair of intersecting drilled bores adjacent and parallel to each of said first and second surfaces, said port openings communicating with the associated pair of drilled bores.

5. A hydraulic fluid translating device comprising: valve means having a valving face, a cylinder block having cylinders therein and one end thereof slidably engaging said cylinder block, a plurality of pistons reciprocably mounted in said cylinders, and a cam member for reciprocating said pistons as the cylinder block rotates relative to said cam member; said valve means including a pair of generally arcuate ports, each of said ports being comprised of a plurality of spaced openings in said valving face serially communicable with the cylinders in said cylinder block, the spaces between said opening being coplanar with said valving surface so that the spaces define bearing surfaces for the cylinder block that receive a fresh supply of lubricant each time a cylinder passes thereover.

6. A hydrostatic transmission as defined in claim 5 wherein said openings are drilled bores substantially perpendicular to said valving face.

7. A hydraulic fluid translating device comprising: valve means having a valving face, a cylinder block having cylinders therein and one end thereof slidably engaging said cylinder block, a plurality of pistons reciprocably mounted in said cylinders, and a cam member for reciprocating said pistons as the cylinder block rotates relative to said cam member; said valve means including a pair of generally arcuate ports, each of said ports being comprised of a plurality of spaced openings in said valving face serially communicable with the cylinders in said cylinder block, the spaces between said opening being coplanar with said valving surface so that the spaces define bearing surfaces for the cylinder block that receive a fresh supply of lubricant each time a cylinder passes thereover, said openings being drilled bores substantially perpendicular to said valving face, each of said ports including a pair of intersecting bores in the valve means substantially parallel to and adjacent said valve face, the associated port openings communicating with said intersecting bores.

8. A hydrostatic transmission, comprising: a hydraulic energy translating pump, an input shaft for driving said pump, a hydraulic energy translating motor, an output shaft driven by said motor; conduit means hydraulically interconnecting the pump and the motor including valve block means supporting both said pump and said motor, said valve block means having a first main passage therein for delivering fluid from the pump to the motor and a second main passage therein for returning fluid from the motor to the pump, said pump and said motor being supported on said block means so that the axes of said shafts are in non-parallel relation, and spaced bearing means in said valve block means, said input shaft being supported in said spaced bearing means.

9. A hydrostatic transmission as defined in claim 8 wherein a portion of said input shaft extends from the side of the valve block means opposite said pump, said projecting portion of said input shaft being adapted to be connected to a source of power, a second portion of said input shaft projecting from said valve block means adjacent said pump for driving said pump.

10. A hydrostatic transmission, comprising: a hydraulic energy translating pump, an input shaft for driving said pump, a hydraulic energy translating motor, an output shaft driven by said motor; conduit means hydraulically interconnecting the pump and the motor including valve block means supporting both said pump and said motor, said valve block means having a first main passage therein for delivering fluid from the pump to the motor and a second main passage therein for returning fluid from the motor to the pump, said pump and said motor being supported on said block means so that the axes of said shafts are in non-parallel relation, and spaced bearing means in said valve block means, said output shaft being supported in said bearing means.

11. A hydrostatic transmission as defined in claim 10 wherein said output shaft has a portion thereof projecting from said valve block means on the side thereof opposite said motor, the projecting portion of said output shaft being adapted to be connected to a driven load, said output shaft having another portion projecting from the side of the valve block means and connected to be driven by said motor.

12. A hydrostatic transmission, comprising: a hydraulic energy translating pump, an input shaft for driving said pump, a hydraulic energy translating motor, an output shaft driven by said motor; and conduit means hydraulically interconnecting the pump and the motor including valve block means supporting both said pump and said motor, said valve block means having a first main passage therein for delivering fluid from the pump to the motor and a second main passage therein for returning fluid from the motor to the pump, said pump and said motor being supported on said block means so that the axes of said shafts are in non-parallel relation, said input shaft extending completely through said valve block means and having a portion thereof projecting from the side of the valve block means opposite said pump, said output shaft extending completely through said valve block means and having a portion projecting from the side thereof opposite said motor.

13. A hydrostatic transmission, comprising: a hydraulic energy translating pump, an input shaft for driving said pump, a hydraulic energy translating motor, an output shaft driven by said motor; conduit means hydraulically interconnecting the pump and the motor including valve block means supporting both said pump and said motor, said valve block means having a first main passage therein for delivering fluid from the pump to the motor and a second main passage therein for returning fluid from the motor to the pump, said pump and said motor being supported on said block means so that the axes of said shafts are in non-parallel relation, and bearing means in said valve block means supporting said input shaft, a portion of said input shaft extending from the side of the valve block means opposite said pump, said projecting portion of said input shaft being adapted to be connected to a source of power.

14. A hydrostatic transmission, comprising: a hydraulic energy translating pump, an input shaft for driving said pump, a hydraulic energy translating motor, an output shaft driven by said motor; conduit means hydraulically interconnecting the pump and the motor including valve block means supporting both said pump and said motor, said valve block means having a first main passage therein for delivering fluid from the pump to the motor and a second main passage therein for returning fluid from the motor to the pump, said pump and said motor being supported on said block means so that the axes of said shafts are in non-parallel relation, and bearing means in said valve block means supporting said output shaft, said output shaft having a portion thereof projecting from said valve block means on the side thereof opposite said motor, the projecting portion of said output shaft being adapted to be connected to a driven load.

References Cited

UNITED STATES PATENTS

| 2,265,314 | 12/1941 | Rose | 60—53 |
| 3,170,297 | 2/1965 | Larson | 60—53 |
| 3,177,665 | 4/1965 | Power | 60—53 |
| 3,279,172 | 10/1966 | Kudo et al. | 60—53 |

EDGAR W. GEOGHEGAN, *Primary Examiner.*